United States Patent [19]
Mermelstein

[11] Patent Number: 6,052,793
[45] Date of Patent: Apr. 18, 2000

[54] WAKEUP EVENT RESTORATION AFTER POWER LOSS

[75] Inventor: Lois D. Mermelstein, Austin, Tex.

[73] Assignee: Dell USA, L.P., Round Rock, Tex.

[21] Appl. No.: 09/095,354

[22] Filed: Jun. 10, 1998

[51] Int. Cl.⁷ .................................................... G06F 1/30
[52] U.S. Cl. ............................................ 713/340; 714/22
[58] Field of Search .................................. 713/300, 340, 713/310; 714/22–24

[56] References Cited

U.S. PATENT DOCUMENTS

| | | | |
|---|---|---|---|
| 5,276,890 | 1/1994 | Arai | 713/300 |
| 5,530,879 | 6/1996 | Crump et al. | 713/300 |
| 5,557,777 | 9/1996 | Culbert | 713/300 |
| 5,603,038 | 2/1997 | Crump et al. | 395/750 |
| 5,638,541 | 6/1997 | Sadashivaiah | 713/300 |
| 5,715,465 | 2/1998 | Savage et al. | 395/750 |

OTHER PUBLICATIONS

"Advanced Configuration and Power Interface Specification," Revision 1.0, Intel Corporation/Microsoft Corporation/Toshiba Corporation, Dec. 22, 1996 (75 pages), see pp. 9–148 to 9–153 and 1–1 to 3–25.

"Advanced Power Management (APM) BIOS Interface Specification," Revision 1.2, Intel Corporation/Microsoft Corporation, Feb. 1996 (80 pages), see pp. 1–14.

"LT430TX ATX Motherboard Technical Product Specification," Intel Corporation, Apr. 10, 1997 (77 pages), see pp. 65–66.

"82371AB PCI–TO–ISA / IDE Ecelerator (PIIX4)," Intel Corporation, Apr. 1997, (284 pages), see pp. 137–148 and 228–231.

*Primary Examiner*—Glenn A. Auve
*Attorney, Agent, or Firm*—Skjerven, Morrill, MacPherson, Franklin & Friel, L.L.P.; Marc R. Ascolese

[57] ABSTRACT

A basic input output system (BIOS) or equivalently functional circuitry can determine when a power on reset in a computer system is due to an invalid event (e.g. power loss) and subsequently re-enable a computer system wakeup event. Additionally, the computer system is restored to its power state prior to the invalid event, thereby advantageously allowing a computer system configuration to be returned to the desired configuration after an invalid event and without unnecessary computer system activity.

27 Claims, 2 Drawing Sheets

WAKEUP EVENT RESTORATION AFTER POWER LOSS

BACKGROUND OF THE INVENTION

1. Field of the Invention

This invention relates to power management for computer systems and, more particularly, to restoration of wakeup event enablement after a computer system suffers a power loss.

2. Description of the Related Art

Many computer systems, including personal computers, workstations, servers, and embedded systems are designed to have multiple peripheral devices included in the system. A typical personal computer system includes a processor, associated memory and control logic and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives or digital video/versatile disk (DVD) drives. Additionally, the underlying circuitry of computer systems including processors, graphics chips, memories, and control logic are continually becoming more complex and feature-rich. However, computer systems having some or all of these characteristics tend to consume great amounts of power.

To reduce power consumption, various components of a computer system can be placed into a variety of different power states with differing levels of power consumption. For example, video output from a computer system, processor operation, and hard disk drive rotation can be deactivated during periods of system inactivity. More sophisticated power management schemes have been developed and implemented as industry standards including the Advanced Power Management APM) Specification described in the *Advanced Power Management* (APM) BIOS *interface Specification, Revision* 1.2, dated February, 1996, and the Advanced configuration and Power Interface (ACPI) standard described in the *Advanced configuration and Power Interface Specification, Revision* 1.0, dated Dec. 22, 1996, both of which are hereby incorporated herein, in there entirety, by reference.

Such standards define a variety of operational states depending upon system activity and the amount of power being consumed. For example, the ACPI specification defines six "sleeping" states S0–S5. In the S0 state (also known as the G0 state) the computer system is fully on and operational, consuming maximum power. In the S5 state (also known as the soft-off state) the computer system consumes a minimal amount of power. No code is executed in the computer system, almost all devices are inactive, and the computer system awaits a wakeup event to transition it to a higher activity state. Awakening from the soft-off state requires a complete boot of the computer system because no system context is saved prior to entering S5. The sleep states between S0 and S5 each specify varying amounts of component activity and therefore power consumption. States S1–S4 may have differing wakeup latency times depending upon which devices are inactive, how much computer system context was saved prior to entering the sleep state, and other factors. Power management schemes like APM and ACPI need not have multiple sleep states, but may simply have a fully on state and a state of lower power consumption, such as a soft-off power state.

A computer system can be configured to wake from the soft-off sleep state in response to a variety of different wakeup events including, for example: (1) a user pressing a power on or resume button; (2) wakeup on local area network (LAN) where the computer system's LAN adapter or network interface card (NIC) monitors network traffic for a wakeup signal such as a Magic Packets™; (3) wakeup on realtime clock (RTC) alarm; (4) wakeup on lid, where opening the lid of a portable computer generates the wakeup event; and (5) wakeup on ring indicated (RI) where a modem asserts its RI line when it detects a ring on the phone line.

System support for these wakeup events is usually implemented in a power management circuit that is part of the computer system's core logic chipset One example of a core logic chip that includes power management circuitry is available from Intel Corporation under the trade designation 82371 AB PCI-to-ISA/IDE Xcelerator (PIIX4). The PIIX4 supports wakeup from soft-off events by maintaining power to its suspend well logic and monitoring appropriate registers, while power to the rest of the chip (and most or all of the rest of the computer system) is removed. In one example of enabling a computer system using the PIIX4 to transition from the soft-off state to the fill on power state after a wakeup on LAN event, bit 9 of the PIIX4's General Purpose Enable Register (GPEN) is set to 1. With wakeup on LAN thus enabled, when the PIIX4 receives an appropriate signal from the attached network, bit 9 of the General Purpose Status Register (GPSTS) is asserted and the computer system begins the transition to the fully on power state.

As the example of the PIIX4 illustrates, when the system is in the soft-off state, it appears to a user that the system is off, even though some power management circuitry is still powered and monitoring inputs, such as the power button, to determine if the system should be turned on. Typically, a user first selects desired wakeup events via a system setup utility, which stores appropriate settings in a nonvolatile memory (usually a battery backed static random access memory (SRAM)) so that the computer system's basic input output system (BIOS) can restore the settings each time the computer system performs a complete boot and/or when the computer system performs a normal shutdown (e.g. a transition to the soft-off power state).

However, if an invalid shutdown event occurs (e.g. a power loss due to AC power failure), and power is removed from the system, those sections of the power management circuitry responsible for monitoring wakeup events are no longer powered, and hence the system loses its memory of which wakeup events the user wanted enabled. After power restoration, the computer system would not respond to the previously enabled wakeup events, creating confusion because of unexpected system behavior and/or requiring for the user specifically re-enable the desired wakeup events.

Additionally, many power management systems for computer systems are designed so that the default action when power is restored is to power the system on. Since powering the system on as soon as power is available (e.g. when the computer system is plugged in, or when AC power is restored) is undesirable behavior to a user, the computer system's BIOS determines, after each power on event, if the event that caused the power on was a valid event (e.g. power button pressed, or a wakeup event) or an invalid event (e.g. AC was restored after a power loss). If the event was invalid, the power state prior to the invalid event is restored. Where the prior power state was soft-off, as in the example above, no additional boot process is required, and the computer system can be placed in soft-off quite quickly, with minimal effort and no user input Under these circumstances, the computer system is restored to the soft-off state, but the wakeup event is not enabled. Accordingly, it is desirable to have a BIOS program or circuit that can restore enabled wakeup events and return a computer system to its previous power state without requiring unnecessary execution of the boot process.

SUMMARY OF THE INVENTION

It has been discovered that determining when a power on reset is due to an invalid event and subsequently re-enabling a computer system wakeup event and restoring the computer system to its power state prior to the invalid event advantageously allows a computer system to be returned to the desired configuration after an invalid event and without unnecessary computer system activity.

Accordingly, one aspect of the present invention provides a method of re-enabling a computer system wakeup event after a computer system power on reset Whether the power on reset was caused by an invalid event is determined. When the power on reset was caused by an invalid event, wakeup event information is read from a nonvolatile memory, a wakeup event register is configured so as to enable the wakeup event, and the computer system is placed in a power state. The power state is determined by the power state of the computer system prior to the invalid event Another aspect of the invention provides a basic input output system (BIOS). The BIOS includes a reset validity routine, a wakeup event restoration routine, and a power state selection routine. The reset validity routine determines whether a computer system power on reset is due to an invalid event. The wakeup event restoration routine enables a wakeup event in a computer system when the reset validity routine determines that the power on reset is due to an invalid event. The power state selection routine is operable to place the computer system in a power state previously enabled prior to the invalid event.

In still another aspect of the invention, a computer system includes a processor, a volatile memory coupled to the processor, a nonvolatile memory coupled to the processor, a power management circuit coupled to the processor, and a basic input output system (BIOS). The power management circuit includes at least one wakeup event register. The BIOS is encoded in a computer readable medium as inductions executable on the processor, and includes a reset validity routine, a wakeup event restoration routine, and a power state selection routine. The reset validity routine determines whether a computer system power on reset is due to an invalid event. The wakeup event restoration routine enables a wakeup event in a computer system when the reset validity routine determines that the power on reset is due to an invalid event. The power state selection routine is operable to place the computer system in a power state previously enabled prior to the invalid event In yet another aspect of the invention, a computer system includes a processor, a volatile memory coupled to the processor, a nonvolatile memory coupled to the processor, and a power management circuit coupled to the processor and including at least one wakeup event register. The computer system also includes a reset validity means for determining whether a computer system power on reset is due to an invalid event, a wakeup event restoration means for enabling a wakeup event in the computer system when the reset validity routine determines that the power on reset is due to an invalid event, and a power state selection means for placing the computer system in a power state previously enabled prior to the invalid event.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
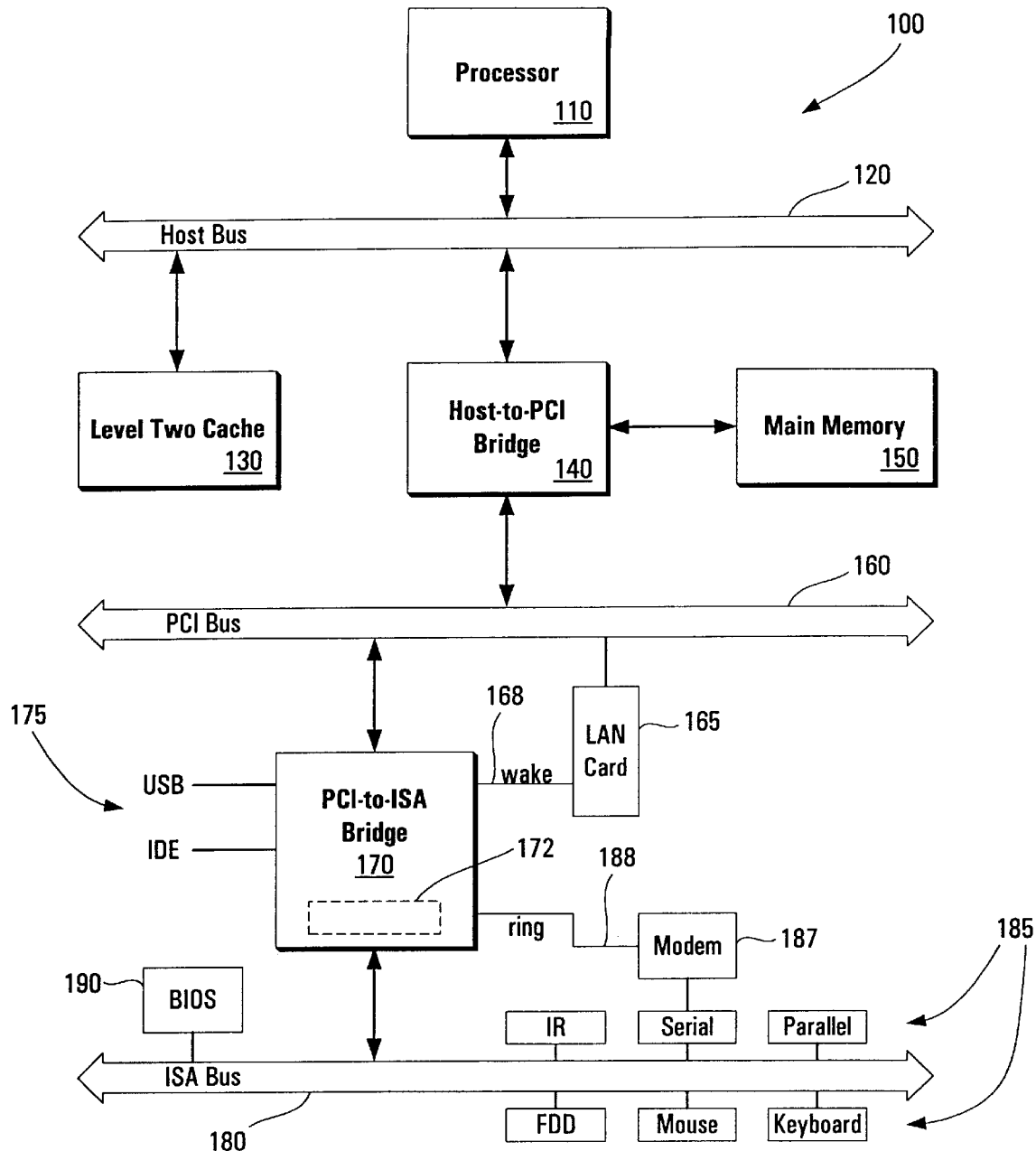
FIG. 1 is a block diagram of a computer system.

FIG. 1 illustrates a computer system 100 which is a simplified example of a computer system capable of restoring wakeup events after an invalid shutdown event Computer system 100 includes processor 110 which is coupled to host bus 120. A level two (L2) cache memory 130 is also coupled to the host bus 120. Host-to-PCI bridge 140 is coupled to main memory 150, includes cache memory and main memory control functions, and provides bus control to handle transfers among PCI bus 160, processor 110, L2 cache 130, main memory 150, and host bus 120. PCI bus 160 provides an interface for a variety of devices including, for example, LAN card 165. PCI-to-ISA bridge 170 provides bus control to handle transfers between PCI bus 160 and ISA bus 180, IDE and universal serial bus (USB) functionality 175, power management functionality 172, and can include other functional elements not shown, such as a real-time clock (RTC), DMA control, interrupt support, and system management bus support. An example of PCI-to-ISA bridge 170 is the aforementioned PIIX4. Peripheral devices and input/output (I/O) devices can be attached to various interfaces 185 coupled to ISA bus 180. Alternatively, many I/O devices can be accommodated by a super I/O controller (not shown) attached to ISA bus 180. I/O devices such as modem 187 are coupled to the appropriate I/O interface, for example a serial interface as shown in FIG. 1.

The BIOS 190 is coupled to ISA bus 180, and incorporates the necessary processor executable code for a variety of low-level system functions and system boot functions, including the capability to restore wakeup events after an invalid shutdown event. BIOS 190 can be stored in any computer readable medium, including magnetic storage media, optical storage media, flash memory, random access memory, read only memory, and communications media conveying signals encoding the instructions (e.g. signals from a network). In order to implement wakeup on LAN capability, LAN card 165 is coupled to PCI-to-ISA bridge 170 and the power management functionality 172 through wake indicator 168. Similarly, to implement wakeup on ring indicated, the ring indicate line 188 couples to PCI-to-ISA bridge 170 and the power management functionality 172.

Power management functionality 172 can include the logic and registers necessary to implement a power management standard such as ACPI, and sleep states and wakeup events such as those described above. Additionally, a nonvolatile memory, such as a battery backed SRAM (not shown) is used to store BIOS parameters, wakeup event information, and power state information. Such a nonvolatile memory can be a separate component, or integrated within another component such as PCI-to-ISA bridge 170.

Figure 2:
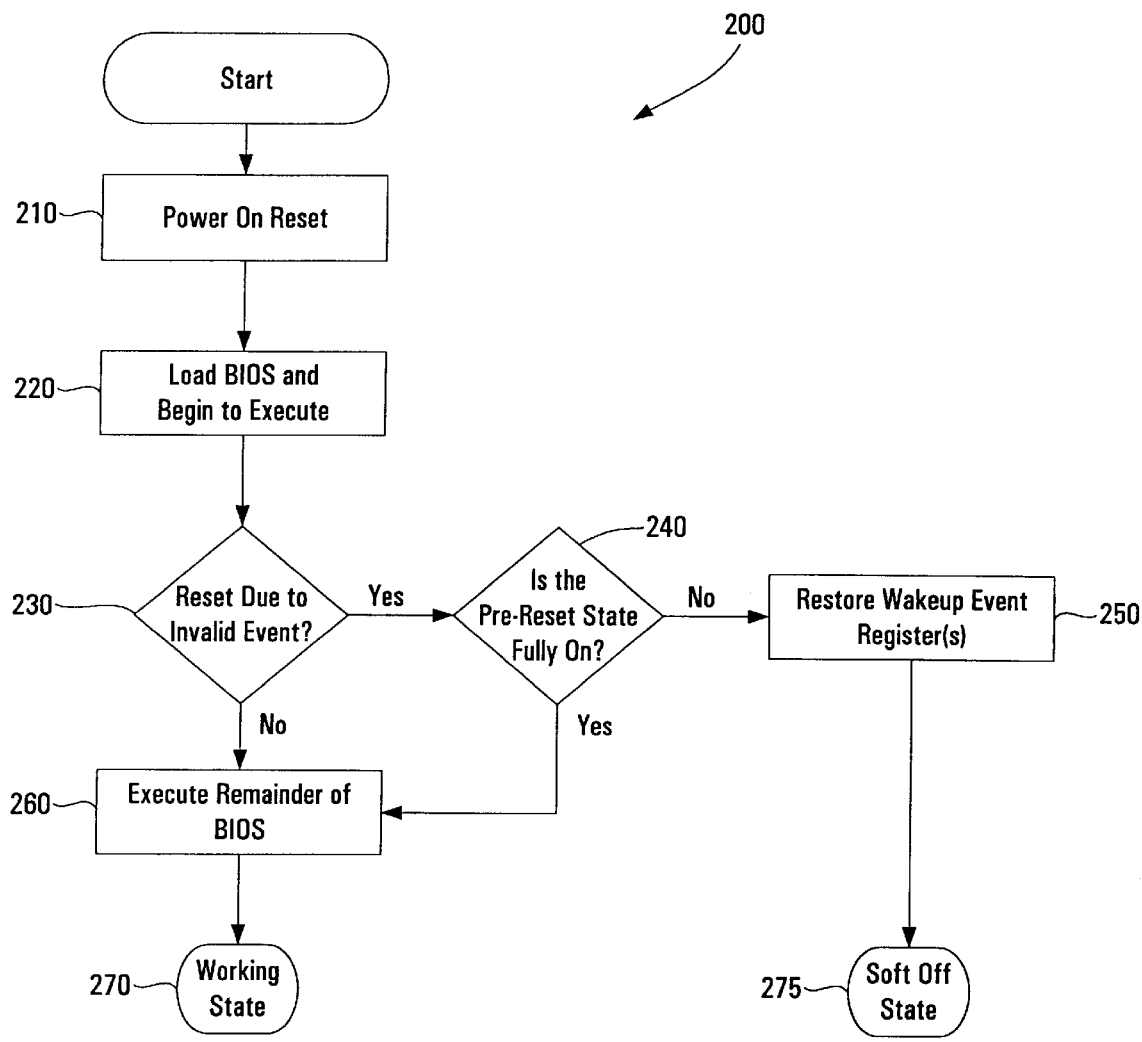
FIG. 2 is a flowchart illustrating a method for restoring wakeup events.

FIG. 2 illustrates the operation the BIOS to restore wakeup event enablement after an invalid event such as a power loss. The process begins when a power on reset 210 occurs. The power on reset can be caused by valid events such as the occurrence of an enabled wakeup event (e.g. a user pressing the computer system's power button), or invalid events such as the restoration of power to the computer system after a power failure. In either case, the BIOS is loaded and its execution begins as shown by item 220. Early in the BIOS code, the computer system is tested to determine if the power on reset was caused by an invalid event This can be accomplished, for example, by polling the power management functionality 172 to determine if the reset was caused by any one of the possible valid events. If not, then the BIOS concludes that the reset was caused by an invalid event. Alternative methods of determining the validity of a power on reset event will be readily apparent to those having ordinary skill in the art.

If the reset is due to an invalid event, the BIOS then determines if the pre-reset power state was the fully on power state, as shown in step 240. Information in nonvolatile memory, such as a power state flag, is examined by the BIOS in order to determine the appropriate power state for the computer system. If the power state flag indicates that the computer system was not in the fully on state prior to the invalid event, the appropriate wakeup event register or registers are restored as indicated in 250. For example, if the wakeup on LAN wakeup event was previously enabled, this information will be indicated in the nonvolatile memory. Using this information, the BIOS resets the necessary bit or bits in the power management circuit's register or registers. The BIOS then returns the system to the soft-off state, 275, without having to continue execution of the BIOS code.

If the reset is not due to an invalid event (230), or the pre-reset power state was the fully on power state (240), step 260 indicates that the remainder of the BIOS is executed in order to take the computer system to the fully on working state 270. Execution of the remainder of the BIOS can also include wakeup event enablement It should also be noted that restoration of other pre-reset power states (e.g. intermediate sleep states) is possible if sufficient pre-reset power state information was stored in a nonvolatile memory. Accordingly, execution of BIOS code that includes wakeup event restoration such as 250 and some additional BIOS routines can be implemented without requiring all of the remaining BIOS code to be executed as in 260.

Those having ordinary skill in the art will readily recognize suitable software implementations for the wakeup event and power state restoration described above, and the particular structures depicted in FIGS. 1 and 2 are merely illustrative of an exemplary set of suitable implementations. In addition to the various possible software implementations for the reset validity, wakeup event restoration, and power state selection routines, the same routines can be equivalently implemented in logic circuitry.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of re-enabling a computer system wakeup event after a computer system power on reset, the method comprising:

determining whether the power on reset was caused by an invalid event; and when the power on reset was caused by an invalid event:
   reading wakeup event information from a nonvolatile memory;
   configuring a wakeup event register so as to enable the wakeup event; and
   placing the computer system in a power state, the power state being determined by the power state of the computer system prior to the invalid event.

2. The method of claim 1 wherein the invalid event is a loss of power to the computer system.

3. The method of claim 1 wherein the wakeup event is one of a wakeup on local area network (LAN) event, a wakeup on ring event, and a wakeup on real-time clock (RTC) event.

4. The method of claim 1 wherein determining whether the power on reset was caused by an invalid event further comprises determining whether the power on reset was caused by one of a plurality of valid events, the plurality of valid events including a wakeup on LAN event, a wakeup on ring event, a wakeup on RTC event, and a power button event.

5. The method of claim 1 wherein the power state of the computer system prior to the invalid event is recorded in a second nonvolatile memory.

6. The method of claim 1 wherein the power state of the computer system prior to the invalid event is one of a soft off state, a sleep state, and a working state.

7. The method of claim 1 wherein placing the computer system in a power state further comprises:

reading a power state flag set in a second nonvolatile memory;

placing the computer system in a power state according to the value of the power state flag.

8. The method of claim 1 encoded in a computer readable medium as instructions executable on a processor, the computer readable medium selected from a set of media including magnetic storage media, optical storage media, flash memory, random access memory, read only memory, and communications media conveying signals encoding the instructions.

9. The method of claim 1 wherein the nonvolatile memory is a battery backed static random access memory (SRAM).

10. A basic input output system (BIOS) comprising:

a reset validity routine determining whether a computer system power on reset is due to an invalid event;

a wakeup event restoration routine, the restoration routine enabling a wakeup event in a computer system when the reset validity routine determines that the power on reset is due to an invalid event; and a power state selection routine operable to place the computer system in a power state previously enabled prior to the invalid event.

11. The BIOS of claim 10 wherein the reset validity routine, the wakeup event restoration routine, and the power state selection routine are operable to be executed early in a computer system boot sequence.

12. The BIOS of claim 10 wherein the invalid event is a loss of power to the computer system.

13. The BIOS of claim 10 wherein the reset validity routine includes a routine determining if the power on reset was caused by a valid event.

14. The BIOS of claim 13 wherein valid events include a wakeup on LAN event, a wakeup on ring event, a wakeup on RTC event, and a power button event.

15. The BIOS of claim 10 wherein the wakeup event is determined by wakeup event information stored in a nonvolatile memory.

16. The BIOS of claim 15 wherein the wakeup event restoration routine sets a bit in a register of a power management circuit based on the wakeup event information stored in the nonvolatile memory.

17. The BIOS of claim 10 wherein the power state selection routine is operable to read a power state flag set in a nonvolatile memory.

18. The BIOS of claim 10 encoded in a computer readable medium as instructions executable on a processor, the computer readable medium selected from a set of media including magnetic storage media, optical storage media, flash memory, random access memory, read only memory, and communications media conveying signals encoding the instructions.

19. A computer system comprising:

a processor;

a volatile memory coupled to the processor;

a nonvolatile memory coupled to the processor;

a power management circuit coupled to the processor, the power management circuit including at least one wakeup event register; and a basic input output system (BIOS) encoded in a computer readable medium as instructions executable on the processor, the BIOS including:

a reset validity routine determining whether a computer system power on reset is due to an invalid event;

a wakeup event restoration routine, the restoration routine enabling a wakeup event in the computer system when the reset validity routine determines that the power on reset is due to an invalid event; and a power state selection routine operable to place the computer system in a power state previously enabled prior to the invalid event.

20. The computer system of claim 19 wherein the wakeup event restoration routine enables the wakeup event by setting a bit in the register based on wakeup event information stored in the nonvolatile memory.

21. The computer system of claim 19 wherein the reset validity routine, the wakeup event restoration routine, and the power executed early in a computer system to be executed early in a computer system boot sequence.

22. The computer system of claim 19 wherein the reset validity routine includes a routine determining if the power on reset was caused by a valid event.

23. The computer system of claim 22 wherein valid events include a wakeup on LAN event, a wakeup on ring event, a wakeup on RTC event, and a power button event.

24. The computer system of claim 19 wherein the power state selection routine is operable to read a power state flag set in the nonvolatile memory.

25. The computer system of claim 19 wherein the computer readable medium is selected from a set of media including magnetic storage media, optical storage media, flash memory, random access memory, read only memory, and communications media conveying signals encoding the instructions.

26. The computer system of claim 19 wherein the nonvolatile memory is a battery backed static random access memory (SRAM).

27. A computer system comprising:

a processor;

a volatile memory coupled to the processor;

a nonvolatile memory coupled to the processor;

a power management circuit coupled to the processor, the power management circuit including at least one wakeup event register;

a reset validity means for determining whether a computer system power on reset is due to an invalid event;

a wakeup event restoration means for enabling a wakeup event in the computer system when the reset validity routine determines that the power on reset is due to an invalid event; and a power state selection means for placing the computer system in a power state previously enabled prior to the invalid event.

* * * * *